United States Patent
Osborne et al.

(10) Patent No.: US 9,620,832 B2
(45) Date of Patent: Apr. 11, 2017

(54) OXYGEN PLENUM CONFIGURATIONS OF COMPONENTS IN LOW COST PLANAR RECHARGEABLE OXIDE-ION BATTERY (ROB) CELLS AND STACKS

(71) Applicant: SIEMENS AKTIENGESELLSCHAFT, München (DE)

(72) Inventors: Charles R. Osborne, Pittsburgh, PA (US); Kevin P. Litzinger, Level Green, PA (US); Shih-Yu W. Liu, Pittsburgh, PA (US); Chun Lu, Breinigsville, PA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/432,648

(22) PCT Filed: Oct. 11, 2013

(86) PCT No.: PCT/US2013/064436
§ 371 (c)(1),
(2) Date: Mar. 31, 2015

(87) PCT Pub. No.: WO2014/062482
PCT Pub. Date: Apr. 24, 2014

(65) Prior Publication Data
US 2015/0255840 A1    Sep. 10, 2015

Related U.S. Application Data

(63) Continuation of application No. 13/651,518, filed on Oct. 15, 2012, now abandoned.

(51) Int. Cl.
*H01M 12/02*    (2006.01)
*H01M 4/38*    (2006.01)
(Continued)

(52) U.S. Cl.
CPC ............ *H01M 12/02* (2013.01); *H01M 4/38* (2013.01); *H01M 4/8605* (2013.01);
(Continued)

(58) Field of Classification Search
CPC .... H01M 12/02; H01M 12/08; H01M 8/0258; H01M 8/0206; H01M 4/38; H01M 4/8605; Y02E 60/50
See application file for complete search history.

(56) References Cited

U.S. PATENT DOCUMENTS 4,054,729 A    10/1977 Isenberg
4,463,064 A *   7/1984 Ruch ..................... H01M 8/246
                                                           204/255
(Continued)

FOREIGN PATENT DOCUMENTS

DE    102011005599 A1    9/2012
WO    2012040253 A1    3/2012

OTHER PUBLICATIONS

Construction of Planar Rechargeable Oxide-Ion Battery Cells and Stacks Using Stainless Steel Housing Structures; Chun Lu et al., U.S. Appl. No. 13/167,900, filed Jun. 24, 2011, "Construction of Planar Rechargeable Oxide-Ion Battery Cells and Stacks Using Stainless Steel Housing Structures." pp. 1-18.

*Primary Examiner* — Patrick Ryan
*Assistant Examiner* — Aaron Greso (57) ABSTRACT

An ROB stack (10') contains a plurality of stacked ROB cells (10) made from: thin metal bipolar housings (13) having air inlets and exits and horizontal channels for feeding air between the inlets (16) and exits (17), the channel having top ridges and also grooves (25) for containing active material (34); a porous air electrode (21/39) next to the air channels allowing air contact; a metal electrode (36); and an oxygen ion transfer membrane (37)

(Continued)

acting as electrolyte; wherein the plurality of all the assemblies form vertical air inlet and outlet plenums.

10 Claims, 5 Drawing Sheets

(51) Int. Cl.
   *H01M 4/86* (2006.01)
   *H01M 8/02* (2016.01)
   *H01M 12/08* (2006.01)
   *H01M 8/0206* (2016.01)
   *H01M 8/0258* (2016.01)

(52) U.S. Cl.
   CPC ....... *H01M 8/0206* (2013.01); *H01M 8/0258* (2013.01); *H01M 12/08* (2013.01); *Y02E 60/128* (2013.01)

(56) References Cited

U.S. PATENT DOCUMENTS

| | | | | |
|---|---|---|---|---|
| 5,650,241 | A * | 7/1997 | McGee | H01M 2/20 429/100 |
| 6,255,012 | B1 * | 7/2001 | Wilson | H01M 8/0221 429/210 |
| 6,399,247 | B1 | 6/2002 | Kitayama et al. | |
| 7,396,612 | B2 | 7/2008 | Ohata et al. | |
| 2004/0202921 | A1 * | 10/2004 | Allen | H01M 8/04283 429/80 |
| 2008/0248352 | A1 * | 10/2008 | McLean | H01M 8/0258 429/443 |
| 2011/0033769 | A1 * | 2/2011 | Huang | H01M 12/005 429/465 |
| 2012/0107714 | A1 * | 5/2012 | Day | H01M 8/0273 429/457 |

\* cited by examiner

Path 1: $Me + xO^{2-} \Longleftrightarrow MeO_x + 2xe^-$

Path 2: $xO^{2-} \Longleftrightarrow x/2\,O_{2(g)} + 2xe^-$
$x/2\,O_{2(g)} + Me \Longleftrightarrow MeO_x$ $x/2\,O_{2(g)} + 2xe^- \Longleftrightarrow xO^{2-}$

OXYGEN PLENUM CONFIGURATIONS OF COMPONENTS IN LOW COST PLANAR RECHARGEABLE OXIDE-ION BATTERY (ROB) CELLS AND STACKS

CROSS REFERENCE TO RELATED APPLICATIONS

This application is a national stage application of PCT/US2013/064436, filed Oct. 11, 2013, which claims the benefit of and priority to U.S. application Ser. No. 13/651,518, filed Oct. 15, 2012, the contents of each application are incorporated by reference herein in their entirety.

BACKGROUND OF THE INVENTION

1. Field of the Invention

This present invention relates to engineering methods for constructing rechargeable oxide-ion battery ROB cells (hereinafter "ROB cells and stacks") which include oxygen/air plenums. More specifically, the invention details low cost fabrication methods and oxygen and auxiliary gas feed flows for practical low weight compact ROB cells and stacks.

2. Description of Related Art

Electrical energy storage is crucial for the effective proliferation of an electrical economy and for the implementation of many renewable energy technologies. During the past two decades, the demand for the storage of electrical energy has increased significantly in the areas of portable, transportation, load-leveling and central backup applications. The present electrochemical energy storage systems are simply too costly to penetrate major new markets. Higher performance is required, and environmentally acceptable materials are preferred. Transformational changes in electrical energy storage science and technology are in great demand to allow higher and faster energy storage at lower costs and longer lifetimes necessary for major market enlargement. Most of these changes require new materials and/or innovative concepts, with demonstration of larger redox capacities that react more rapidly and reversibly with cations and/or anions.

Batteries are by far the most common form of storing electrical energy, ranging from: standard every day lead—acid cells, nickel-metal hydride (NiMH) batteries taught by Kitayama in U.S. Pat. No. 6,399,247 B1, metal-air cells taught by Isenberg in U.S. Pat. No. 4,054,729, and to the lithium-ion battery taught by Ohata in U.S. Pat. No. 7,396,612 B2. These latter metal-air, nickel-metal hydride and lithium-ion battery cells require liquid electrolyte systems.

Batteries range in size from button cells used in watches, to megawatt load leveling applications. They are, in general, efficient storage devices, with output energy typically exceeding 90% of input energy, except at the highest power densities.

Rechargeable batteries have evolved over the years from lead-acid through nickel-cadmium and nickel-metal hydride (NiMH) to lithium-ion batteries. NiMH batteries were the initial workhorse for electronic devices such as computers and cell phones, but they have almost been completely displaced from that market by lithium-ion batteries because of the latter's higher energy storage capacity. Today, NiMH technology is the principal battery used in hybrid electric vehicles, but it is likely to be displaced by the higher power energy and now lower cost lithium batteries, if the latter's safety and lifetime can be improved. Of the advanced batteries, lithium-ion is the dominant power source for most rechargeable electronic devices.

What is needed is a dramatically new electrical energy storage device that can easily discharge and charge a high capacity of energy quickly and reversibly, as needed. What is also needed is a device that can operate for years without major maintenance. What is also needed is a device that does not need to operate on natural gas, hydrocarbon fuel or its reformed by-products such as $H_2$. One possibility is a rechargeable oxide-ion battery (ROB), as set out, for example, in application Ser. No. 12/695,386, filed on Jan. 28, 2010, now U.S. Patent Publication No. 2011/0033769, and application Ser. No. 13/167,900 filed on Jun. 24, 2011 (entitled "Construction of Planar Rechargeable Oxide-Ion Battery Cells and Stacks Using Stainless Steel Housing Structures.")

Figure 1:
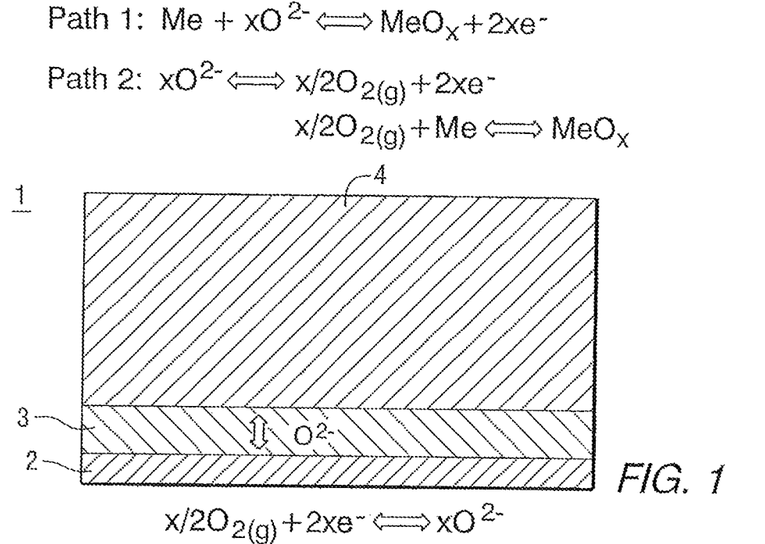
FIG. 1 is a cross-sectional view that illustrates the known working principals of a rechargeable oxide-ion battery (ROB) cell.

A ROB comprises a metal electrode, an oxide-ion conductive electrolyte, and a cathode. The metal electrode undergoes reduction-oxidation cycles during charge and discharge processes for energy storage. The working principles of a rechargeable oxide-ion battery ROB cell 1 are schematically shown in FIG. 1. In discharge mode, oxide-ion anions migrate from high partial pressure of the oxygen side (air electrode—2) to low partial pressure of the oxygen side (metal electrode—4) under the driving force of the gradient oxygen chemical potential. Electrolyte is shown as 3. There exist two possible reaction mechanisms to oxidize the metal. One of them, solid-state diffusion reaction as designated as Path 1, is that oxide ion can directly electrochemically oxidize metal to form metal oxide. The other, gas-phase transport reaction designated as Path 2, involves generation and consumption of gaseous phase oxygen. The oxide ion can be initially converted to a gaseous oxygen molecule on a metal electrode, and then further reacts with metal via solid-gas phase mechanism to form metal oxide. In charge mode, the oxygen species, released by reducing metal oxide to metal via electrochemical Path 1 or solid-gas mechanism Path 2, are transported from a metal electrode back to an air electrode.

During discharge/charge cycles metal redox reactions induce significant volume variation, for instance, if iron (Fe) metal is used, the volume change associated with the reaction of $Fe+\frac{1}{2}O_2=FeO$ is 1.78 times. Therefore, the metal electrode must be appropriately designed so that the drastic volume variation can be properly accommodated. For energy storage application, oxide ion must be transported across the electrolyte between a metal electrode and a cathode to carry electrical charge. Therefore, the metal electrode must be hermetically sealed to prevent direct contact with an oxygen-containing environment (for example, air). Otherwise, oxygen in air will directly consume the metal without involving charge transfer between electrodes, which will lead to self discharge.

The cell voltage for each individual ROB cell is limited in most cases, for practical applications where certain voltage output is demanded, ROB cells must be connected together to form a stack to raise the voltage of a ROB device. Means must be also found to provide oxygen and steam or hydrogen to the stack cells via gas plenums. Additionally, weight must be lowered to make the ROB stacks practical. Thus, there is a need of engineering methods to construct an ROB stack using single ROB cells containing various gas plenums.

It is a main object of this invention to provide ROB cell and stack designs that supply the above needs by using cost-effective materials and processing techniques.

SUMMARY OF THE INVENTION

The above needs for producing a ROB cell and stack are supplied and object accomplished by utilizing an ROB stack comprising: 1) a plurality of stacked ROB cells each ROB cell comprising an electrically conducting thin metal bipolar housing having a very thin thickness of from about 0.1 cm to 0.75 cm, each bipolar housing having openings for vertical air inlets, vertical air exhaust inlets and interiors of horizontal channels for feeding air between the vertical air inlets and exhaust inlets, where said interiors of channels have top ridges; and grooves between the top ridges for containing active material; 2) a porous air electrode disposed next to the interior of the horizontal air channels allowing air contact; 3) a metal electrode; 4) an oxygen ion transfer cell membrane acting as electrolyte, allowing oxygen ion transfer, disposed on top of the metal electrode; and 5) dielectric perimeter seal disposed between the bipolar housings; where, in the plurality of ROB cells, the vertical air inlets and air exhaust inlets form air inlet plenums and air exhaust plenums which allow air contact with adjacent cells and where the horizontal channel ridges and grooves prevent air contact with any active material. Dielectric contacts can be disposed at far edges between the bipolar housings. Preferably, the very thin bipolar housing can be hydro-formed, electroformed or, most preferably, stamped, rather than milled or cast, saving substantial costs and manufacturing time, making the ROB stack more commercially viable.

BRIEF DESCRIPTION OF THE DRAWINGS

For a better understanding of the invention, reference may be made to the preferred embodiments exemplary of this invention, shown in the accompanying drawings in which.

DESCRIPTION OF THE PREFERRED EMBODIMENT

The requirements of a practical, commercial ROB cell include:

a) an air electrode for reversible conversion of oxygen into an oxide ion ($O^{2-}$) that carries/has two electrical charges;

b) an oxide-ion conductive electrolyte for transporting electrical charge in the form of $O^{2-}$;

c) a metal electrode where electrical charge associated with the oxide-ion is stored or released by an active metal component(s), and for accommodating the volume change associated with a metal redox reaction;

d) a reliable seal separating direct contact between air and active metal;

e) air and $H_2$ or steam plenums and distribution means;

f) light weight from use of thin components; and g) cost effectiveness.

Figure 5:
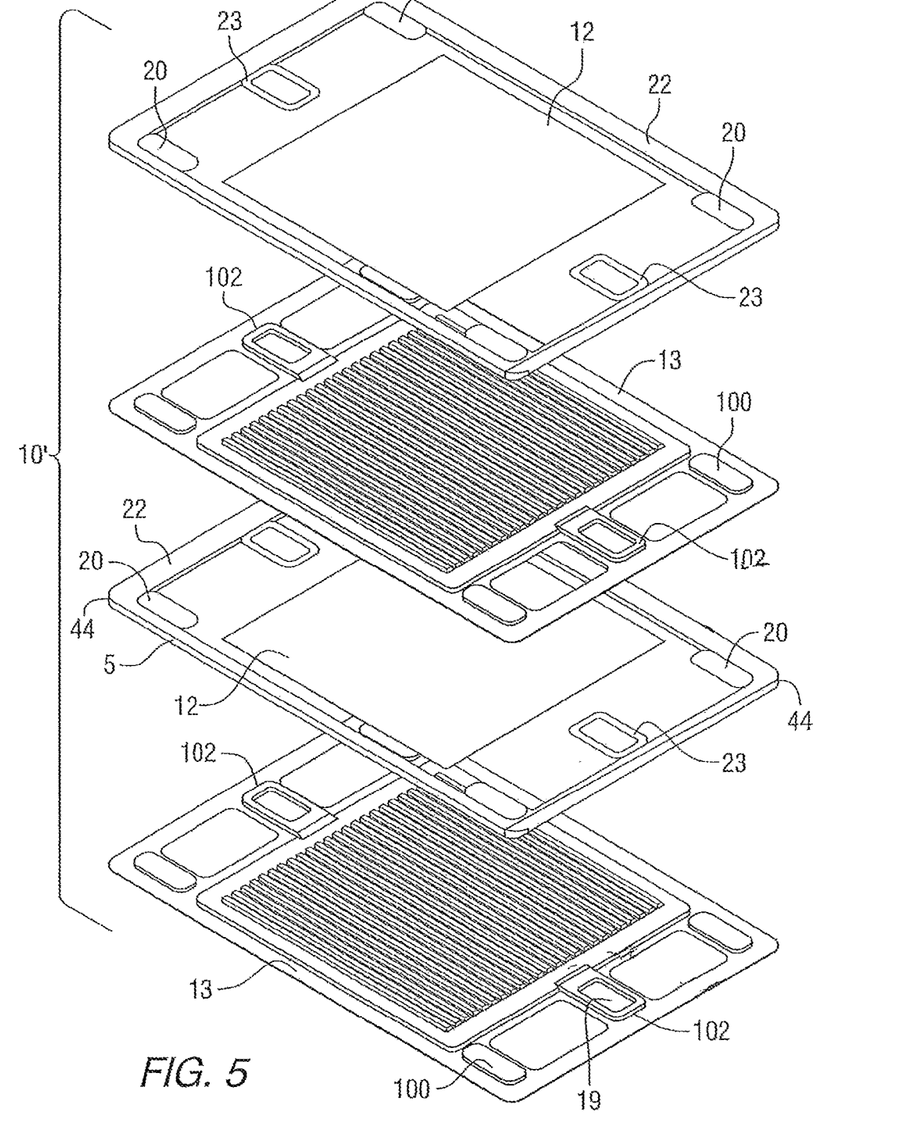
FIG. 5 is a three-dimensional stacked view that illustrates two ROB assemblies stacked on top of each other.

The present invention relates to a low cost method for constructing rechargeable oxide-ion battery (ROB) cells and stacks with emphasis on the geometry of a thin metal bipolar housing that lends itself equally to existing low-cost stamping, hydro-forming, or electroforming fabrication methods, and use of gas feed plenums geometry therein. This metal bipolar housing 13 has a thickness of from about 0.1 cm to 0.75 cm, preferably from about 0.2 cm to 0.5 cm. These novel ROB cells 10, best shown in FIG. 3, have a total thickness 10" each of from about 0.3 cm to 2.5 cm, with a cost savings in materials and processing over cast, milled/machined, or powder formed of from 50% to 200%. A plurality of these ROB cells 10 form a ROB stack 10', having interior air inlet and exhaust plenums, formed by openings for air inlet 16 and air exhaust outlet inlets 17. As shown in FIG. 5, these inlets when combined in stacked relationship form stacked plenum openings as shown by arrows 16, 17 and 18. All components, the metal bipolar housing, air electrode, metal electrode, cell membrane are generally the same thickness described above for the bipolar housing, that is, 0.1 cm to 0.75 cm.

Figure 2:
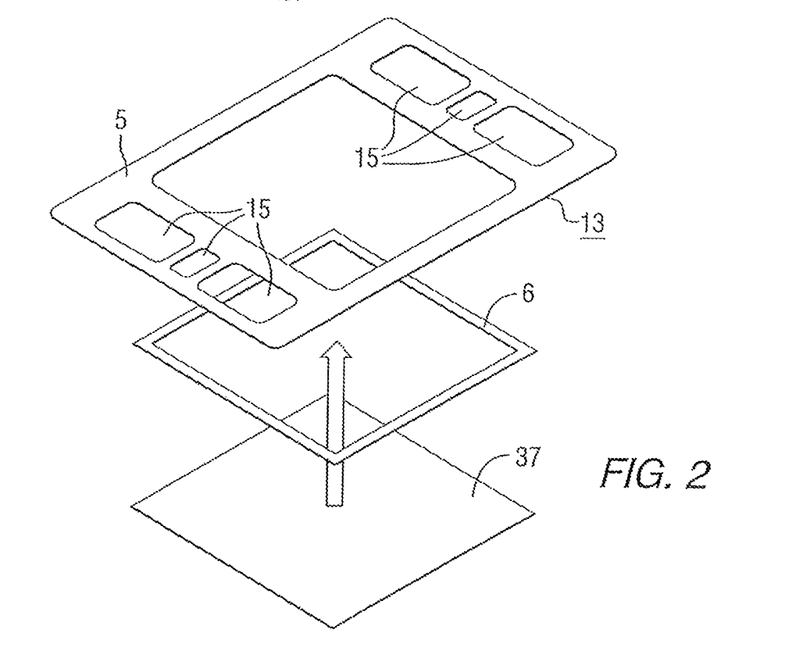
FIG. 2 is a simplified three-dimensional stacked view that generally illustrates a metal framed ROB cell.
Figure 4:
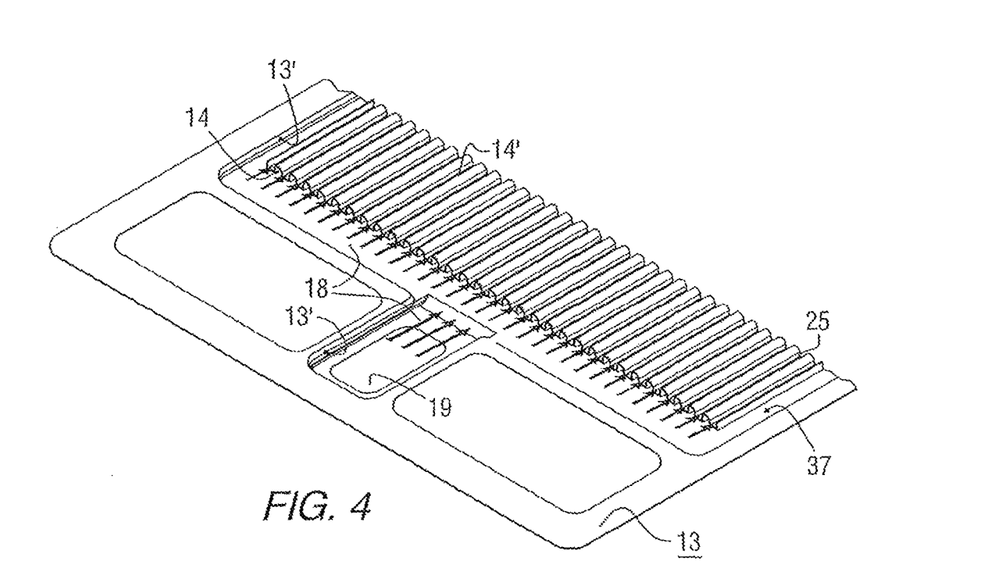
FIG. 4 is one embodiment of a three-dimensional partial view showing horizontal flow paths of gases in a metal bipolar housing structure of the ROB.

In general, the construction of a planar ROB cell 10 requires a metal bipolar housing 13, shown in FIG. 4, with an included plurality of cavities in the form of channels/grooves between ridges, which grooves provide containment for an active metal. This bipolar housing 13 must also serve as an electrical conductor while providing a means to permit air-flow to come into contact with the air electrode cathode of the adjacent ROB cell in a stack array. A ROB cell membrane 37 is attached to a metal frame 5 via a sealed interface 6 as shown in FIG. 2. This assembly is then mated and sealed to the metal bipolar housing via edge welds. An optional feature provides a means to feed a supply of auxiliary gas 18 shown in FIG. 4, such as steam or hydrogen, to the grooves that contain the active metal. This auxiliary gas-flow is facilitated from opposing openings in the bipolar housing and metal frame. Similar opposing openings in the bipolar housing and metal frame facilitate the flow of air across a separate set of channels.

Prior embodiments of experimental planar ROB cell assemblies utilized thick bipolar housings formed via a pressed powder metal process. Other past embodiments of planar ROB cell assemblies utilized thick bipolar housings machined from thick stock metal plate providing bipolar housings. Each of the prior approaches requires lengthy, expensive manufacturing processes and consume high amounts of metal raw material.

This invention provides the functionality to satisfy the aforementioned ROB bipolar housing requirements via a geometry that is intended to be formed from thin metal. The geometry of the metal bipolar housing is intended to be formed by one of several existing low-cost fabrication methods.

More specifically, referring again to FIG. 2, a preferred metal framed ROB cell assembly is generally illustrated. A ROB cell oxygen ion transfer electrolyte cell membrane 37 is attached to a metal frame 5 via a seal 6 interface such as, for example, glass or a metal braze. The metal frame 5 has a plurality of opposing openings 15 that serve, in a stacked relationship, as gas inlet and outlet plenums for both primary and optional auxiliary gas flows. The primary gas is intended to be air and the optional auxiliary gas may be, preferably, steam or hydrogen or their combination. Due to the relative complexity of the ROB assembly, applicants may refer to several figures in the same paragraph in order to try to clarify construction.

Figure 3:
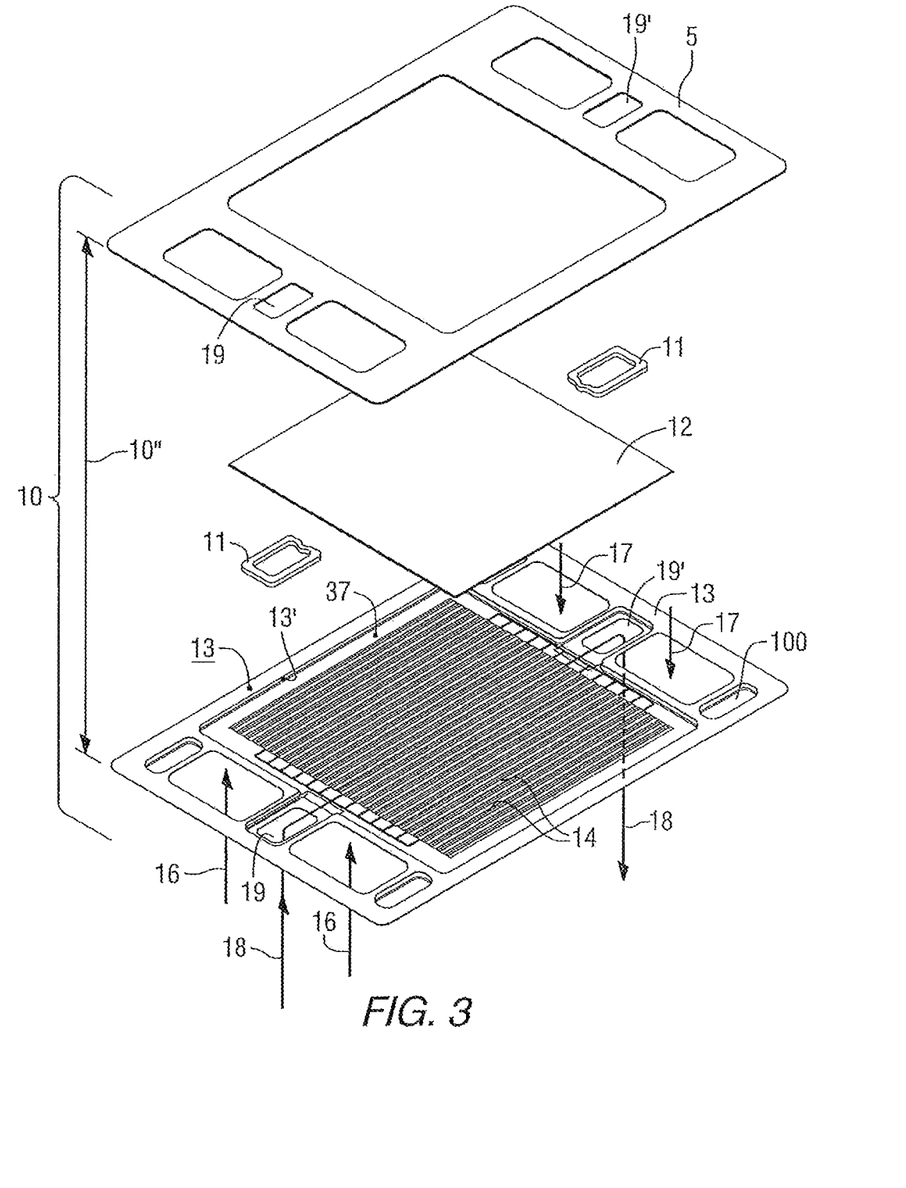
FIG. 3, which best describes the invention, is a three-dimensional view that illustrates one preferred embodiment of a complete ROB cell showing vertical gas flow and horizontal gas flow.
Figure 6:
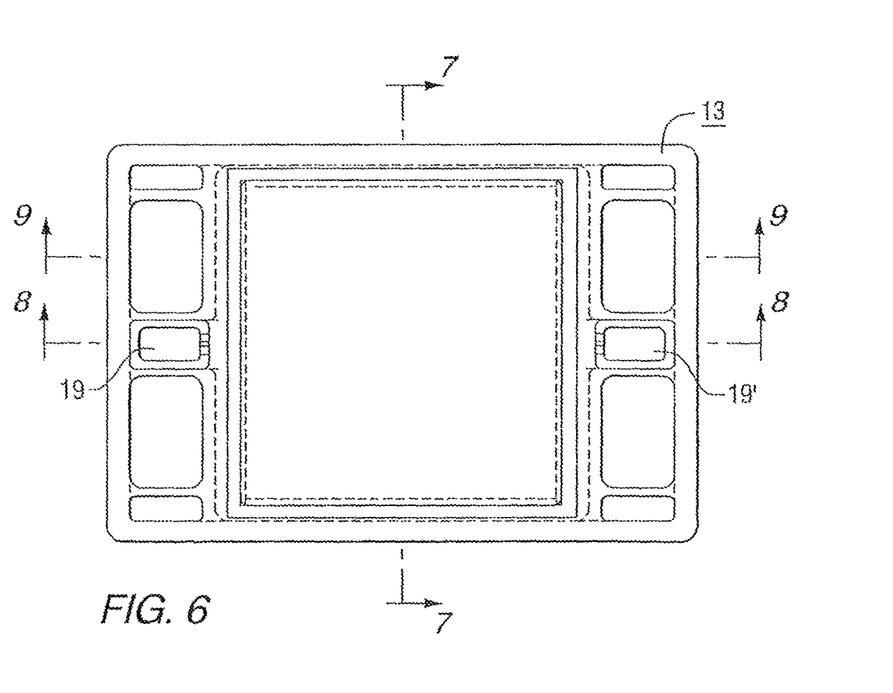
FIG. 6 illustrates a top view of a single metal bipolar housing.

In FIGS. 3 and 4, a planar ROB cell 10 is illustrated, having a total thickness of 10″. A plurality of preferably, from about 5 to 20 of these cell assemblies 10 are stacked to form a ROB stack 10′ in FIG. 5. The plurality of components, shown in FIG. 3, in combination form inlet and exhaust plenums, such as auxiliary gas 18 plenums 19 and 19′ and air plenum generally shown as openings for 16 and 17. Arrows 16, 17 and 18 indicate overall plenum gas flow. The construction of the planar ROB cell assembly includes a metal bipolar housing 13 with a recess 13′ having a bottom containing the ROB cell membrane 37, also shown in FIG. 2, which supports an included plurality of interior and exterior cavities in the form of channels 25 and grooves 14′ between the channels, shown in FIG. 4. These grooves also shown as 14′ in FIG. 4 provide containment for a porous active metal material, while the interior 14 of the channels provide air passage. A number of these grooves may also provide passages for an optional auxiliary gas flow through porous active material. The metal bipolar housing 13 has opposing openings 15, shown in FIG. 2, that serve as air or oxygen gas inlet 16 and exhaust gas inlet 17 for the separate primary and auxiliary gas flows 18. In FIGS. 4 and 6, the steam and/or hydrogen auxiliary gas flow 18 is depicted exiting the small auxiliary inlet 19 and distributing to separate grooves 25 between the channels which grooves and channels span the width of the entire ROB cell membrane 37, as will be further discussed later.

The small auxiliary inlet 19 and output 19′, which are parts of the auxiliary plenums, shown more clearly in FIG. 3, is associated with a recess 13′ that is formed into the metal bipolar housing 13, as shown in FIG. 3. The auxiliary gas flow is collected by an identical opposing small auxiliary outlet 19′. It is anticipated that the auxiliary gas flow will be relatively small; hence, the auxiliary gas flow pressure drop should aid in provide a uniform distribution of flow. The metal bipolar housing 13 can have four formed rectangular support bosses 100 at each corner.

These support bosses 100 along with the two central formed bosses 102 at the locations of the auxiliary plenums, shown in FIG. 5, provide a defined load path to the adjacent ROB cell when assembled into a stack configuration. Additionally, two formed optional compression spacer bosses 11, shown in FIG. 3, over and around the locations of the auxiliary inlet plenum 19, provide a flanged seal surface to maintain separate auxiliary and primary gas plenums.

Figure 8:
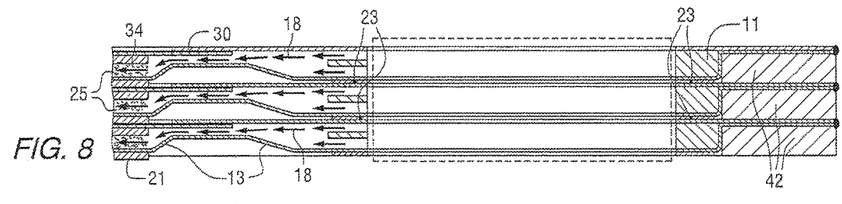
FIG. 8 is one embodiment of a cross-sectional view of section 8-8 shown in FIG. 6 showing auxiliary gas flow.
Figure 9:
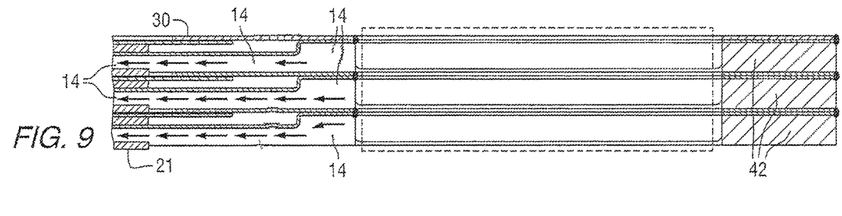
FIG. 9 is one embodiment of a cross-sectional view of section 9-9 shown in FIG. 6 showing air or oxygen gas flow.

The metal bipolar housing 13 serves as an electrical conductor. The electrical path is created by the incorporation of a compliant and porous electrical contact. This electrical contact 12 is mated to the tops of the ridges formed by the plurality of channels. The framed ROB cell assembly 10 is then installed by mating it to the flange at the perimeter of the metal bipolar housing. The installation of the framed ROB cell assembly slightly compresses the electrical contact to form continuity with the ROB cell membrane. Finally, this framed ROB cell assembly is then sealed to the metal bipolar housing via edge weld seals 30, that are depicted in FIGS. 7, 8 and 9.

Referring back to FIGS. 4 and 5, the ROB stack comprises two or more planar ROB cells 10 stacked atop one another. Two auxiliary flow seals 23 are located between the two flanged seal surfaces located at the auxiliary plenums of the metal bipolar housing 13 of one planar ROB cell and the mating surface of the framed ROB cell assembly 10, shown in FIG. 3, of the mating planar ROB cell assembly to contain the separate auxiliary gas plenums from the primary plenums. A design requirement of the ROB assembly is the prevention of air from coming into contact with the active metal electrode material.

The two auxiliary flow seals 23 also serve as a dielectric to prevent the current path from shorting across the planar ROB cell assemblies. Four dielectric contacts 20 constructed from the same material used for the flow seals 23 are placed at the four edges shown as 44 between the bipolar housings 13 at the formed support bosses. An additional perimeter seal 22 is be placed between opposing bipolar housings of the planar ROB cell assemblies to prevent air from bypassing from the air inlet plenum to the outlet plenum. This perimeter seal 22 must also serve as a dielectric for the same aforementioned reasons. The perimeter seal 22 can be glass or a compressible porous ceramic material, that permits only a small amount of total air leakage (generally <3 vol. %). Finally, a second compliant and porous electrical contact 12 is inserted between the metal bipolar housing 13 of one planar ROB cell assembly and the mating surface of the ROB cell membrane 37 of the mating planar ROB cell assembly.

Figure 7:
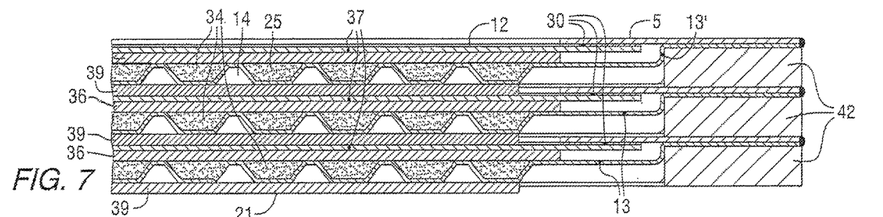
FIG. 7 is a cross-sectional view of section 7-7 shown in FIG. 6.

FIGS. 7-9 provide details of a preferred embodiment of the invention and are not meant to be limiting. FIG. 7 shows the section view 7-7 taken from the view in FIG. 6 and helps understand location of channels and grooves. The construction of the planar ROB cell assembly requires a metal bipolar housing 13 with an included plurality of separate open, unimpeded air/oxidant interior channels 14 and grooves 25, where the grooves 25 provide containment for a porous active metal 34, shown in dotted cross-section. The channels 14 permit air flow to come into contact with the porous air electrode cathode 39 of the adjacent cell in a stack array. FIG. 7 depicts the separate air channels 14, and also the grooves 25 that house the active metal material 34. Edge weld seals 30 are located at the interface of the ROB cell membranes 37 and the metal frame 5. Perimeter seals are shown as 42.

FIG. 8 shows the section view 8-8 taken from the view in FIG. 6. The inlet auxiliary flow plenum is depicted and the flow path auxiliary gas 18 is shown as it feeds into a typical active metal groove 25, containing porous active material 34. Several seals are depicted including the seal welds at the outer edge, the auxiliary flow seals 23, the perimeter seals 42, and compressed spacer 11.

FIG. 9 shows the section view 9-9 taken from the view in FIG. 6. The inlet air flow plenum is depicted and the flow path is shown as it feeds into a typical air flow 14 as it goes into the interior of the air interior channel 14. Several seals are depicted including the seal welds at the outer edge and edge of the air plenum. Edge seals 30 are located at the interface of the ROB cell membrane and the metal frame. Perimeter seals are shown as 42.

Reiterating; prior embodiments of ROB cells constructed at Siemens utilized bipolar housings formed via a pressed powder metal process or machined from stock metal plate which both inherently consume higher amounts of metal raw material. Each of the prior approaches requires expensive manufacturing processes unsuitable for both high volume and low cost production. This invention provides the functionality to satisfy the aforementioned ROB bipolar housing requirements via a complex geometry that is intended to be formed from thin metal. The final metal bipolar housing will be much lighter than prior embodiments resulting in greater energy storage density. The complex geometry of the metal bipolar housing is intended to be formed by one of several existing well known low-cost fabrication methods including stamping, hydro-forming, or electroforming.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A rechargeable oxide ion battery (ROB) stack comprising:
   a plurality of stacked ROB cells, each ROB cell comprising an electrically conducting metal bipolar housing having a thickness of from about 0.1 cm to 0.75 cm, wherein each bipolar housing comprises openings for vertical air inlets and vertical air exhaust inlets, each bipolar housing further including a recessed portion for housing a cell membrane, wherein each cell membrane comprises:
      a plurality of channels and grooves defined between the channels, wherein the grooves are filled with a porous active metal material defining a metal electrode which stores or releases oxide ions;
      a porous air electrode disposed adjacent the channels allowing contact with a fluid flowing through the channels; and
      an electrical contact disposed on the channels; and
   a dielectric perimeter seal disposed between the bipolar housings wherein, in the plurality of ROB cells, the vertical air inlets and air exhaust inlets form air inlet plenums and air exhaust plenums which allow air contact with adjacent ROB cells, and wherein the channels and grooves prevent air contact with any active material.

2. The ROB stack of claim 1, wherein dielectric contacts are disposed at far edges between the bipolar housings.

3. The ROB stack of claim 1, wherein the bipolar housing is stamped.

4. The ROB stack of claim 1, wherein the bipolar housing is hydro-formed.

5. The ROB stack of claim 1, wherein the bipolar housing is electroformed.

6. The ROB stack of claim 1, wherein the bipolar housing is 0.2 cm to 0.5 cm thick.

7. The ROB stack of claim 1, wherein the perimeter seal allows no more than 3 vol. % total air leakage.

8. The ROB stack of claim 1, also having vertical auxiliary gas plenums, which horizontally feed an auxiliary gas selected from the group consisting of hydrogen gas and steam through the active material.

9. The ROB stack of claim 1, having a total cell thickness of from about 0.3 cm to about 2.5 cm.

10. The ROB stack of claim 1, wherein the bipolar housing is not milled or cast.

* * * * *